(12) United States Patent
Moon et al.

(10) Patent No.: US 8,175,013 B2
(45) Date of Patent: May 8, 2012

(54) RADIO FREQUENCY SWITCH

(75) Inventors: Young-Chan Moon, Gyeonggi-do (KR); Kang-Hyun Lee, Gyeonggi-do (KR)

(73) Assignee: KMW Inc. (KR)

( * ) Notice: Subject to any disclaimer, the term of this patent is extended or adjusted under 35 U.S.C. 154(b) by 296 days.

(21) Appl. No.: 12/442,698

(22) PCT Filed: Dec. 22, 2006

(86) PCT No.: PCT/KR2006/005679
§ 371 (c)(1), (2), (4) Date: Mar. 24, 2009

(87) PCT Pub. No.: WO2008/038861
PCT Pub. Date: Apr. 3, 2008

(65) Prior Publication Data
US 2010/0008267 A1   Jan. 14, 2010

(30) Foreign Application Priority Data
Sep. 27, 2006  (KR) .................. 10-2006-0094285

(51) Int. Cl.
*H04B 1/44* (2006.01)
*H04B 7/00* (2006.01)

(52) U.S. Cl. ................... 370/278; 370/280; 455/81

(58) Field of Classification Search .......... 370/277–280; 455/78–83
See application file for complete search history.

(56) References Cited

U.S. PATENT DOCUMENTS

| | | | |
|---|---|---|---|
| 5,545,511 A * | 8/1996 | Hulderman et al. | 430/315 |
| 5,638,033 A * | 6/1997 | Walker et al. | 333/1.1 |
| 5,701,595 A | 12/1997 | Green, Jr. | |
| 5,768,690 A | 6/1998 | Yamada et al. | |
| 5,923,647 A * | 7/1999 | Dolman et al. | 370/280 |
| 6,226,275 B1 * | 5/2001 | Yang et al. | 370/280 |
| 6,591,086 B1 * | 7/2003 | Pleasant | 455/78 |
| 6,614,332 B2 * | 9/2003 | Yamashita et al. | 333/239 |
| 7,242,911 B2 * | 7/2007 | Yu | 455/78 |
| 7,373,115 B2 * | 5/2008 | Monroe | 455/82 |
| 7,564,323 B2 * | 7/2009 | Kim et al. | 333/103 |
| 7,605,674 B2 * | 10/2009 | Kim | 333/103 |
| 2002/0175784 A1 * | 11/2002 | Yamashita et al. | 333/239 |
| 2005/0255812 A1 | 11/2005 | Na et al. | |
| 2006/0035600 A1 | 2/2006 | Lee et al. | |

(Continued)

FOREIGN PATENT DOCUMENTS

CN    1 235 715 A    11/1999

(Continued)

OTHER PUBLICATIONS

Chinese Patent Office, Examination Report, Jun. 30, 2011.

(Continued)

*Primary Examiner* — Hassan Kizou
*Assistant Examiner* — Roberta A Shand

(57) ABSTRACT

Disclosed is a radio frequency (RF) switch including: a circulator having first to third nodes, which are connected to first to third ports, respectively; and a slot line pattern unit installed in a connection line between the third node of the circulator and the third port so as to carry out signal transmission or interception, wherein the slot line pattern unit includes a switching circuit, which is installed at a predetermined location so as to transmit or intercept a signal by maintaining or short-circuiting a gap of a slot line corresponding to the installed location according to an external switching control signal.

13 Claims, 8 Drawing Sheets

U.S. PATENT DOCUMENTS

| | | | |
|---|---|---|---|
| 2006/0040620 A1* | 2/2006 | Jung et al. | 455/82 |
| 2008/0290962 A1* | 11/2008 | Kim et al. | 333/103 |

FOREIGN PATENT DOCUMENTS

| | | |
|---|---|---|
| EP | 0086586 A1 | 8/1983 |
| EP | 0740427 A1 | 10/1996 |
| JP | 54104719 A | 8/1979 |
| JP | 60172864 A | 9/1985 |
| JP | 9186626 A | 7/1997 |
| JP | 09-289469 A | 11/1997 |

OTHER PUBLICATIONS

Japanese Patent Office, Examination Report re: Japanese Patent Application 2009-530240, May 24, 2011.

* cited by examiner

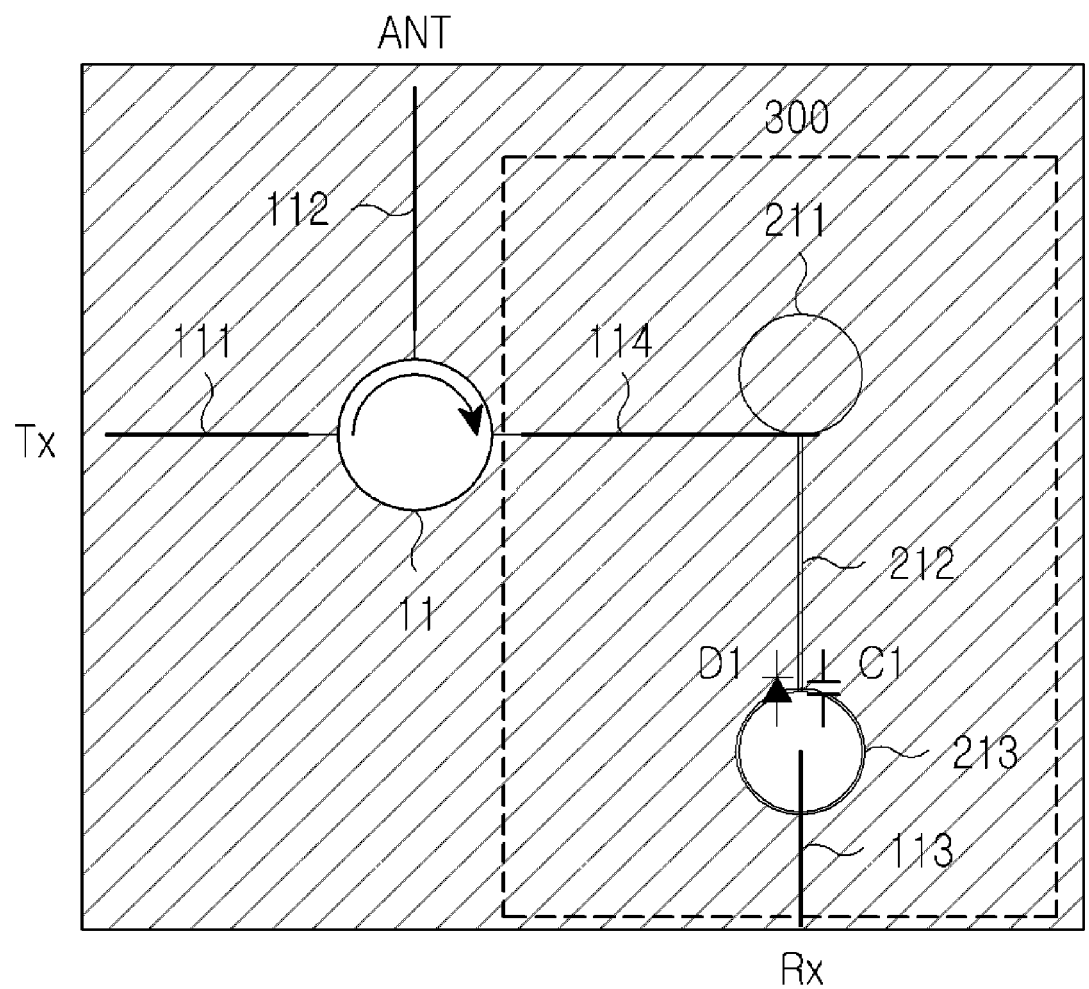
[Fig. 2]

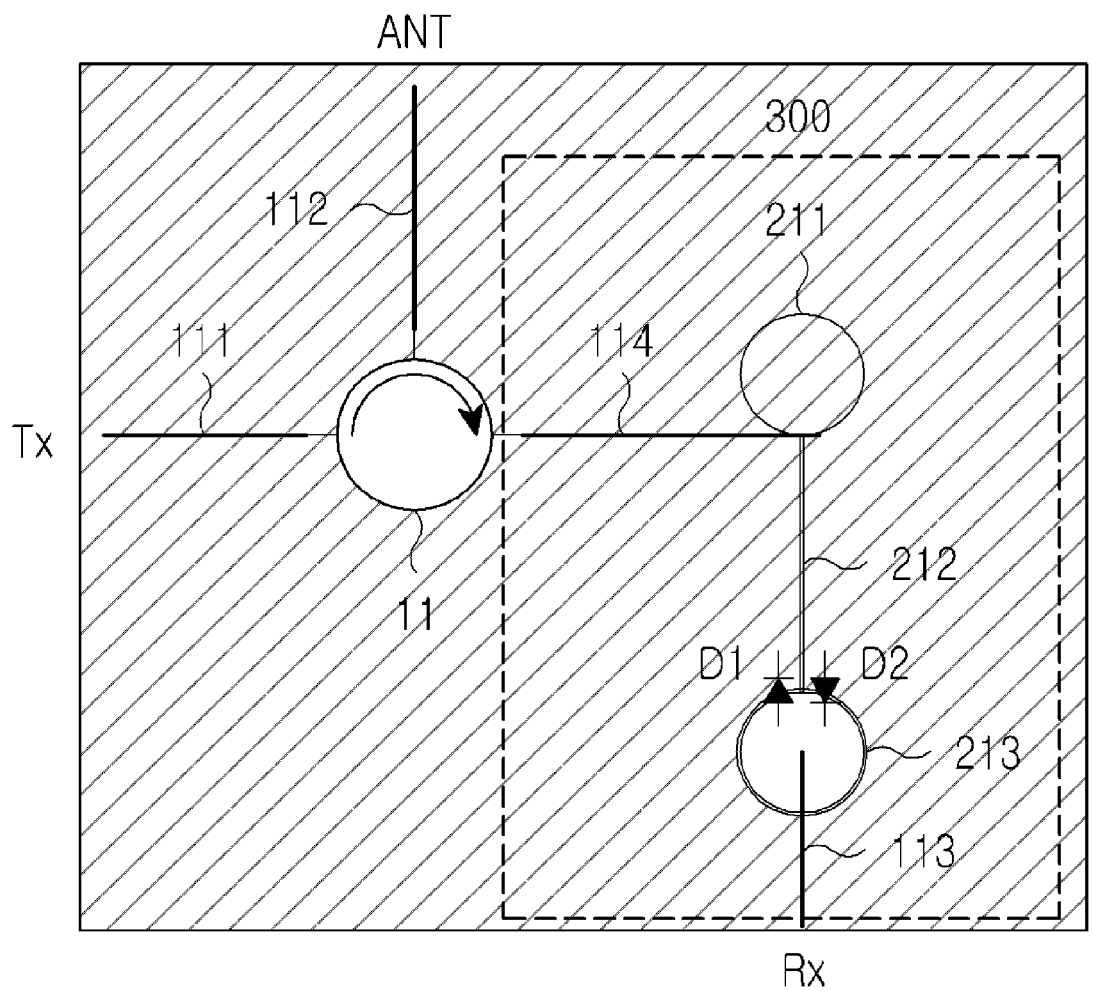

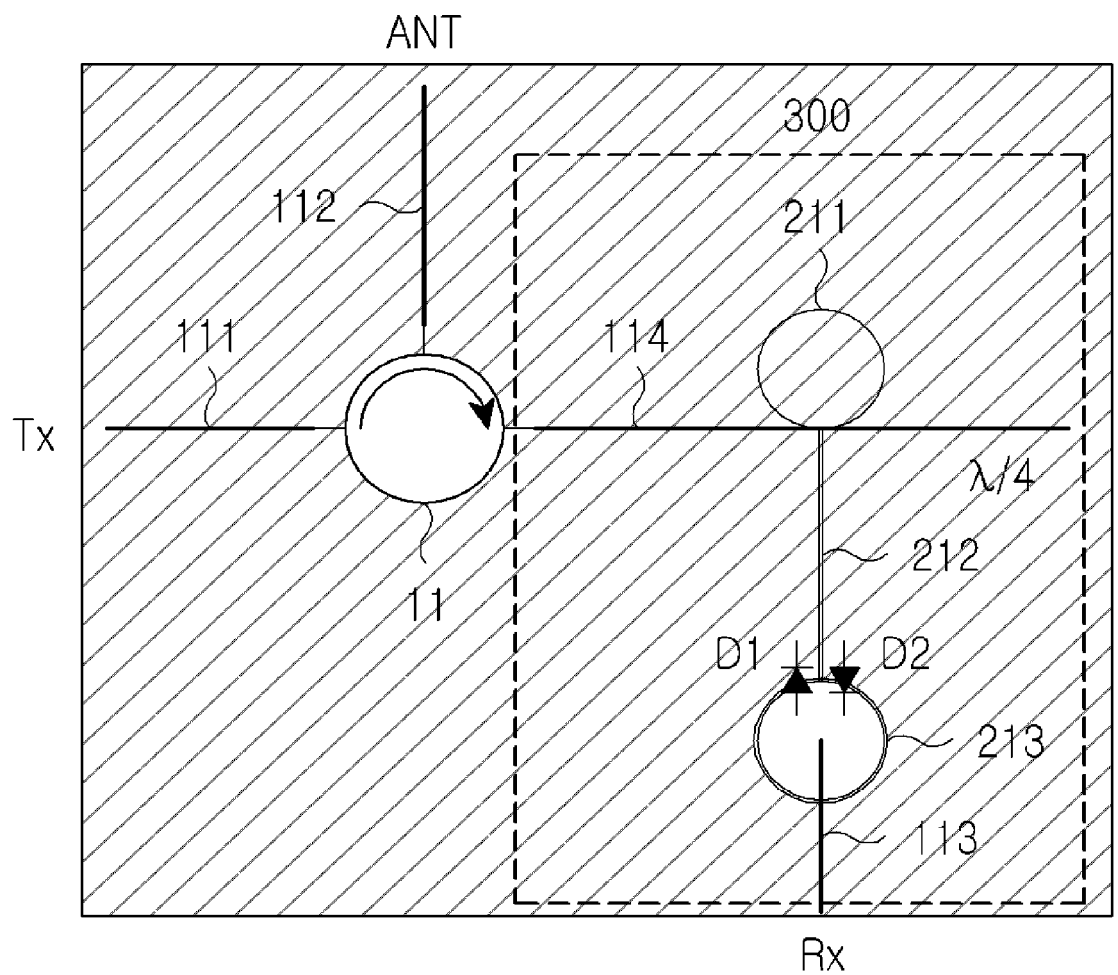
[Fig. 4]

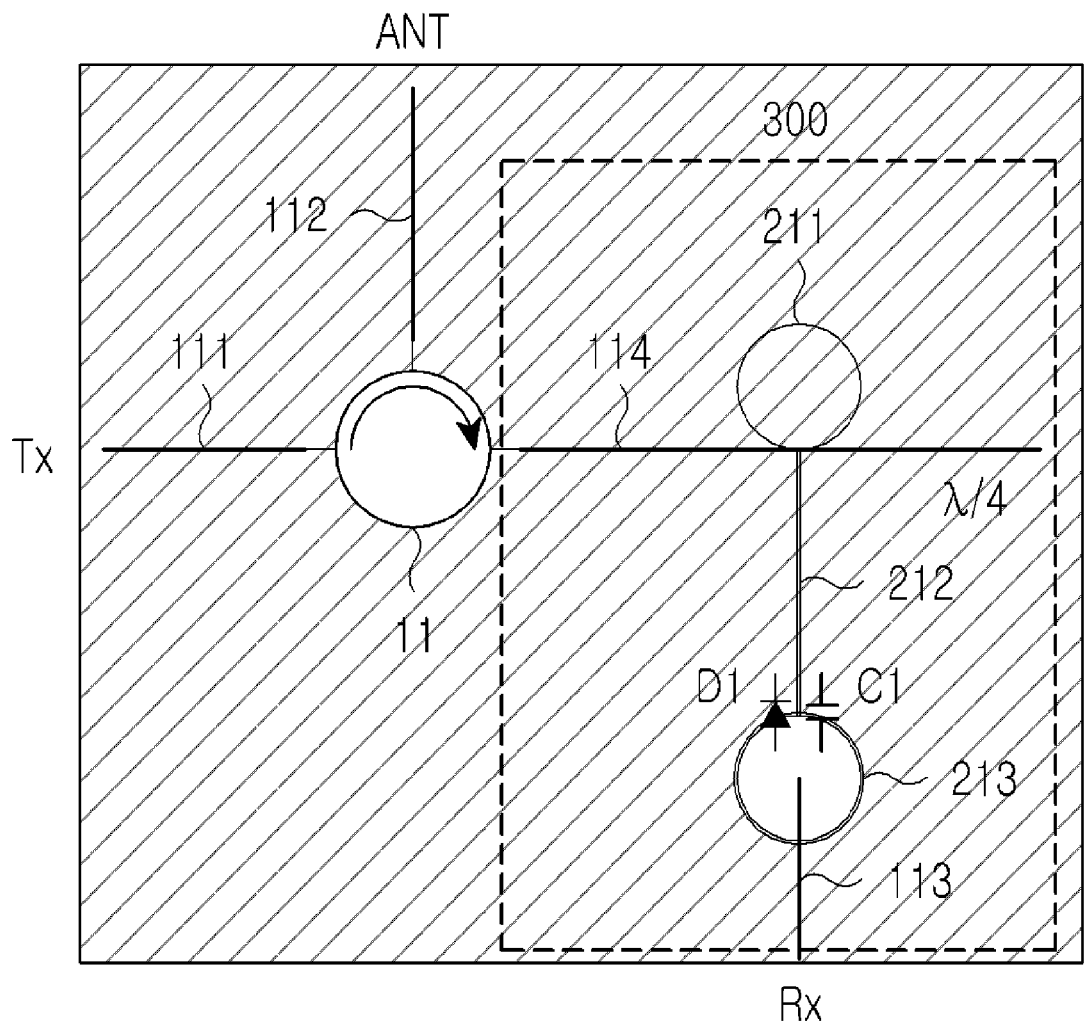
[Fig. 5]

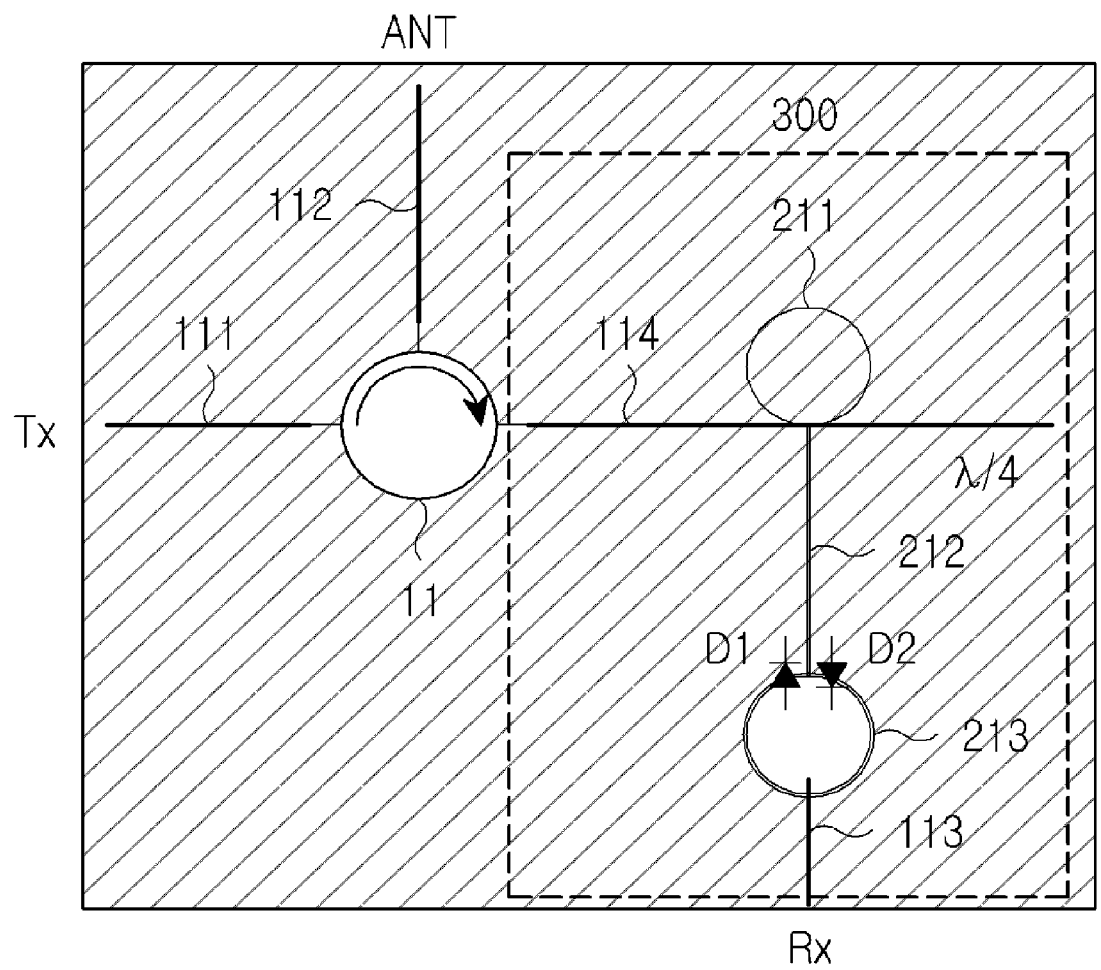
[Fig. 6]

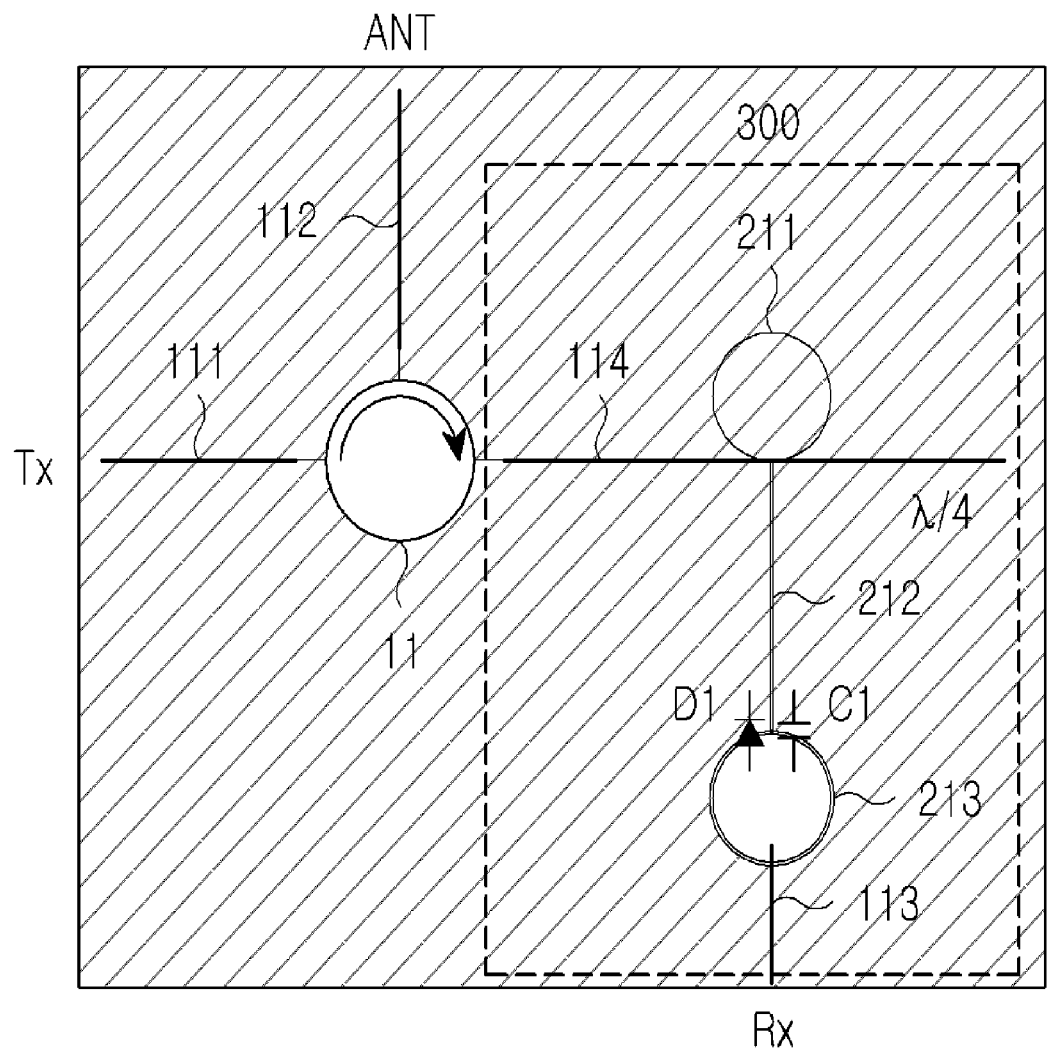
[Fig. 7]
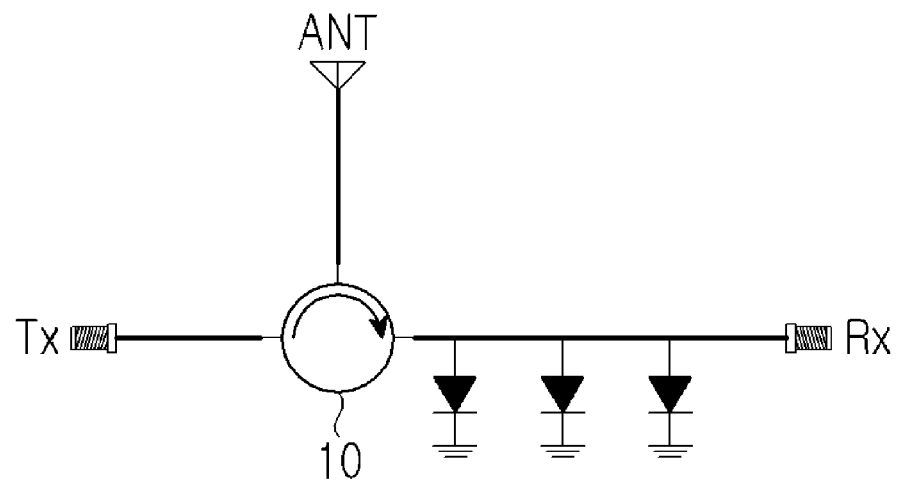
[Fig. 8]

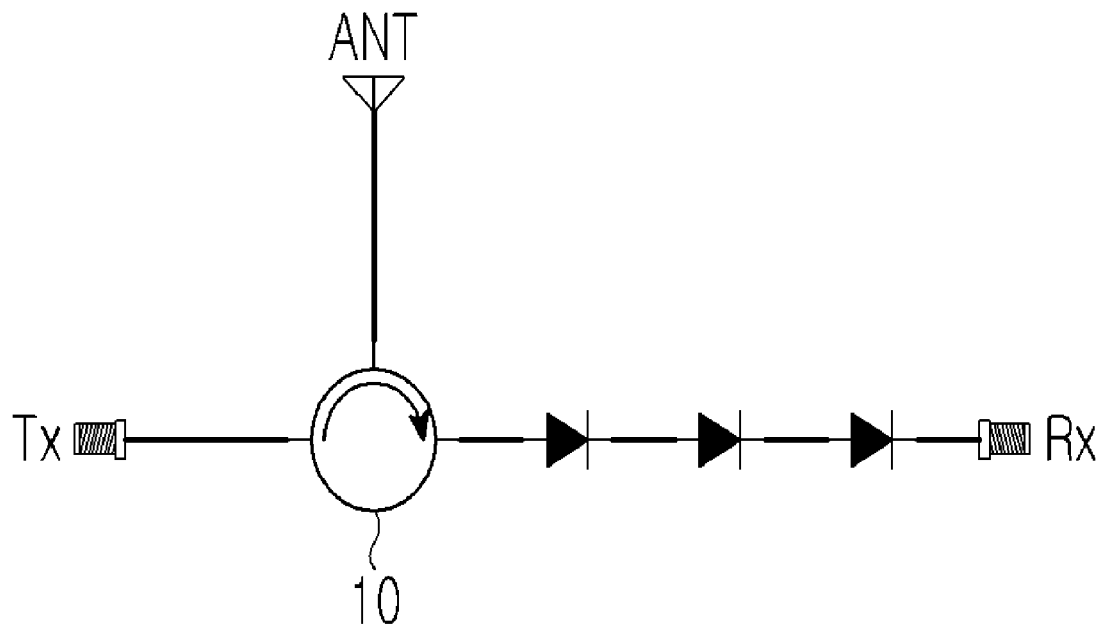
[Fig. 9]

RADIO FREQUENCY SWITCH

TECHNICAL FIELD

The present invention relates to a Radio Frequency (RF) switch, and more particularly to an RF switch adapted to be used as a changeover switch for transmission/reception signals in a signal transmission/reception terminal of a time division duplexing (TDD) system.

BACKGROUND ART

In general, the second and third generation (2G and 3G) mobile communication systems employs a frequency division duplexing (FDD) scheme. In the FDD scheme, a transmission signal and a reception signal are separated by a duplexer. However, recently 3.5G and 4G mobile communication systems are expected to generally use the TDD scheme.

The time division transmission scheme, such as the TDD scheme, discriminates between transmission and reception signals using the same frequency by means of time division, in which bidirectional communication is performed with one frequency by dividing the inside of one frame into transmission and reception sections.

FIG. 1 is a block diagram illustrating the construction of a transmission/reception terminal unit in a conventional TDD system. A transmission signal "Tx" is amplified by a power amplifier 40 to have a predetermined power, passes through a transmission/reception changeover switch 10 and a full-band filter 50, and is then radiated through an antenna 60. In contrast, a reception signal "Rx" received through the antenna 60 passes through the full-band filter 50 and transmission/reception changeover switch 10, and is then amplified through a power amplifier 20 (e.g., low-noise amplifier (LNA)) for reception signals, which has been established to have a proper gain. The changeover switch 10 may perform a switching operation according to switching control signals which are provided by a controller (not shown) based on transmission and reception operations.

Since the TDD system separates transmission and reception according to a predetermined time period using the same frequency, as described above, the TDD system must include an RF switch for high transmission power and high-speed changeover between transmission and reception.

Since the RF switch must enable a high-speed switching operation, a switch (such as a PIN diode or field-effect transistor (FET)) using a semiconductor device, rather than a mechanical switch, is generally used as the RF switch. However, there is a difficulty in using such a switch utilizing a semiconductor device as a high-power switch because of semiconductors' inability to handle high power.

In other words, when high power is applied to the switch, a large amount of heat is generated and may destroy the switch if sufficient heat radiation is not guaranteed. For this reason, an RF switch to withstand high power has been developed. However, the RF switch for high power is very expensive because it must include a separate cooling radiator and so on, and the manufacture thereof is not easy, so that the RF switch is restrictedly used only for military purposes.

In order to solve such a problem, a conventional TDD system employs a method of fixedly separating transmission and reception signals by means of a circulator 10, as shown in FIGS. 8 and 9, instead of an RF switch. However, when such a circulator 10 is used as a switch, there is a difficulty in securing an isolation enough to intercept a transmission signal during a reception section. Also, when there is a problem in the antenna during transmission of a transmission power, an antenna may be open, a VSWR values may be degraded, or the supply of the operation power may be interrupted. Then, a transmission signal flows in a receiver, thereby causing system failure or serious trouble in system equipment, so that the quality of radio waves is deteriorated.

DISCLOSURE OF INVENTION

Technical Problem

Accordingly, the present invention has been made to solve the above-mentioned problems occurring in the prior art, and an object of the present invention is to provide an RF switch adapted for transmission/reception changeover in a TDD system, which can secure a high isolation between a transmission terminal and a reception terminal with respect to a high-power transmission signal, and can protect a system.

Another object of the present invention is to provide an RF switch adapted for a transmission/reception changeover in a TDD system, which can prevent a high-power transmission signal from flowing in a reception terminal and prevent the occurrence of an error in the system even if an antenna is open or even if an error occurs in a DC power supply for control operation.

Still another object of the present invention is to provide an RF switch using a semiconductor device, which can secure a condition for sufficient heat radiation, thereby maintaining a stable operation state even with respect to high power, and can improve quality of communication and enlarge the capacity thereof through high-speed switching.

Still another object of the present invention is to provide an RF switch which can be easily manufactured even in a type of microwave integrated circuit (MIC).

Still another object of the present invention is to provide an RF switch which can be used even in a high-frequency band of several tens of GHz or higher, as well as the frequency band for mobile communication.

Technical Solution

To accomplish these objects, in accordance with one aspect of the present invention, there is provided a radio frequency (F) switch including: a circulator having first to third nodes, which are connected to first to third ports, respectively; and a slot line pattern unit installed in a connection line between the third node of the circulator and the third port so as to carry out signal transmission or interception, wherein the slot line pattern unit includes a switching circuit, which is installed at a predetermined location so as to transmit or intercept a signal by maintaining or short-circuiting a gap of a slot line corresponding to the installed location according to an external switching control signal.

Advantageous Effects

The transmission/reception changeover switching apparatus for a TDD system according to the present invention can secure a high isolation between transmission and reception paths.

Also, even when an antenna is open, or an error occurs in a DC power supply for control operation, it is possible to significantly reduce the amount of a transmission power that flows in a reception terminal through total reflection, so that active elements in the reception terminal can be protected.

Also, according to the present invention, a transmission signal is transmitted through a slot line having a sufficient ground plane, so that it is possible to manufacture an RF switch using a semiconductor device which enables a high-speed switching operation and can be used for high power.

In addition, since the RF switch according to the present invention can be easily applied even to a type of microwave integrated circuit (MIC), the RF switch can be manufactured simultaneously with a general process for semiconductor.

Furthermore, the RF switch according to the present invention can be used even in a high-frequency band of several tens of GHz or higher as well as the frequency band for mobile communication, so that the RF switch can be easily applied to satellite communication, military radar, etc.

BRIEF DESCRIPTION OF THE DRAWINGS

FIG. 2 is a plan view illustrating the construction of a circuit pattern of an RF switch for transmission/reception changeover in a time division duplexing (TDD) system according to an embodiment of the present invention FIGS. 3 to 7 are views illustrating examples modified from the RF switch of FIG. 2; and FIGS. 8 and 9 are views illustrating the constructions of conventional RF switches.

MODE FOR THE INVENTION

Figure 1:
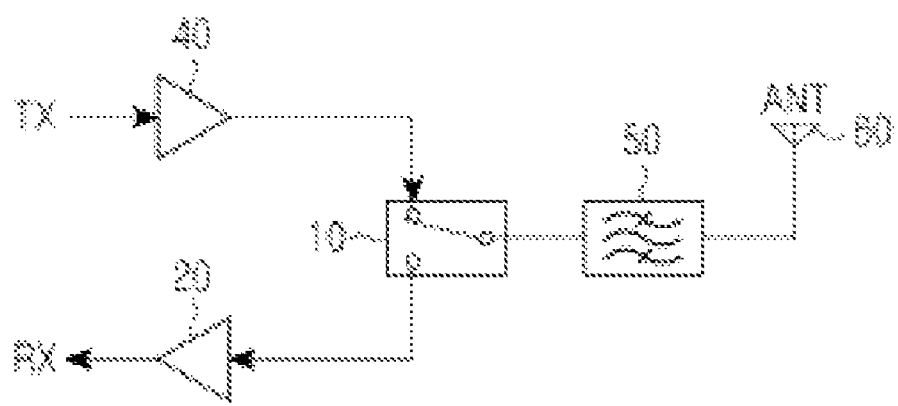
FIG. 1 is a block diagram illustrating the construction of a transmission/reception terminal unit in a conventional TDD system.

Hereinafter, one preferred embodiment according to the present invention will be described with reference to the accompanying drawings. In the below description, many particular items such as a detailed component device are shown, but these are given only for providing better understanding of the present invention, it will be understood by those skilled in the art that the present invention can be embodied without including these particular items.

FIG. 2 is a representative view illustrating the construction of a circuit pattern on a printed circuit board of an RF switch for transmission/reception changeover in a time division duplexing (TDD) system according to the present invention, in which the size and shape of each component is exaggerated or simplified for convenience of description. The RF switch according to the present invention includes a circulator 11 which has first to third nodes connected to first to third ports, respectively, and a slot line pattern unit 300 which is installed in a connection line between the third port and the third node of the circulator 11 so as to carry out signal transmission or interception. The slot line pattern unit 300 includes a switching circuit, which is installed at a predetermined location so as to transmit or intercept a signal by maintaining or short-circuiting the gap of a slot line corresponding to the installed location according to an external switching control signal.

The slot line pattern unit 300 includes microstrip lines and slot lines, which are formed in predetermined patterns on the upper and lower surfaces of one printed circuit board. That is, in FIG. 2, the slot line pattern unit 300 includes a dielectric substrate having a predetermined permittivity, in which microstrip lines 111, 112, 113 and 114 having a predetermined pattern are formed on the upper surface of the dielectric substrate, and slot lines 212 and 213 having a predetermined pattern are formed on the lower surface of the dielectric substrate. The microstrip lines and slot lines have such a construction that signal transition is carried out between them by a microstrip-slot line coupling at a predetermined location.

The construction of the slot line pattern unit 300 will now be described in more detail with reference to FIG. 2. First, when the first to third ports of the RF switch are formed as the first to third microstrip lines 111, 112 and 113, respectively, the slot line pattern unit 300 has the first slot line 212, which is provided at one end thereof with an open slot 211 so that signal transition may be carried out between the first slot line 212 and the fourth microstrip line 114 connected to the third node of the circulator 11. The first slot line 212 is provided at the other end thereof with a loop-shaped or circular slot line pattern unit 213, so that signal transition can occur between the first slot line 212 and the third microstrip line 113 at a location of the loop-shaped or circular slot line pattern unit 213, which is opposite to a location of the loop-shaped or circular slot line pattern unit 213 connected with the first slot line 212.

The fourth microstrip line 114 is provided at an end thereof with a terminal open circuit or terminal short circuit so that signal transition can efficiently occur between the fourth microstrip line 114 and the first slot line 212, which is installed to intersect with the fourth microstrip line 114, with a substrate located therebetween. FIG. 2 shows an example in which the end of the fourth microstrip line 114 is formed as a terminal short circuit. When the end of the fourth microstrip line 114 is formed as a terminal short circuit, the terminal short circuit may be connected to a ground plane of a lower surface on which slot line patterns are formed by forming a circle-shaped hole extending through the substrate at the end, and coating the inside surface of the hole with a proper conductive metal. Also, FIG. 2 shows the third microstrip line 113 formed as a terminal open circuit, which has an open end extended by a length of $\lambda/8$ from the point of intersection between the loop-shaped or circular slot line pattern unit 213 and the microstrip line 113, thereby maximizing the magnetic field for signal transition at the point of intersection.

In addition, the slot line pattern unit 300 includes a switching device (e.g., a first diode D 1 and a first capacitor C 1), which is installed at a predetermined location of the loop-shaped or circular slot line pattern unit 213 so as to intercept signal transmission by short-circuiting the gap of a slot line corresponding to the installed location according to an external switching control signal. In this case, each of the switching elements is installed between both ends of the loop-shaped or circular slot line pattern unit 213 at a connection location between the loop-shaped or circular slot line pattern unit 213 and the first slot line 212 so as to short-circuit the gap of the slot line at the corresponding location.

When the first diode D 1 is in an "on" state, a signal applied from the first slot line 212 to the loop-shaped or circular slot line pattern unit 213 is transited to the microstrip line 113. In contrast, when the first diode D 1 is in an "off" state, a signal applied from the first slot line 212 to the loop-shaped or circular slot line pattern unit 213 is divided into two signals having a phase difference of 180° therebetween at a connection location at which the loop-shaped or circular slot line pattern unit 213 is connected with the first slot line 212, and the divided signals are transmitted along hemicycle slot lines, respectively. Then, the divided signals are offset by the phase difference of 180° at a location at which the divided signals are added, that is, at a transition position between the loop-shaped or circular slot line pattern unit 213 and the third microstrip line 113.

Meanwhile, a switching control signal applied to the switching elements may include bias voltages (e.g., +5V/−5V) supplied individually or so on to the switching elements through an electrically-isolated ground substrate so as to control the on/off operations of the switching elements.

The aforementioned RF switch according to the present invention can be used as a transmission/reception changeover switching apparatus for a TDD system by connecting the first to third ports of the first to third microstrip lines 111, 112 and 113 with a transmission terminal "Tx", an antenna terminal "Ant" and a reception terminal "Rx", respectively. Hereinafter, the operation of the RF switch having the construction as shown in FIG. 2 will be described when the RF switch is used as a transmission/reception changeover switching apparatus for a TDD system.

First, in a transmission mode, when an RF transmission signal is applied to the first port through the transmission terminal "Tx" while the first diode D1 is maintained in an "off" state, the transmission signal is input to the first node of the circulator 11 via the first microstrip line 111, is output through the second node of the circulator 11, and is output to the antenna terminal "Ant" through the second microstrip line 112, which is the second port.

In this case, a signal, which may be output through the third node of the circulator 11 and flow into the fourth microstrip line 114, flows into the first slot line 212 and the loop-shaped or circular slot line pattern unit 213. Then, the signal is divided at the location of a slot line corresponding to the installation location of the first diode D 1 and first capacitor C 1 in the loop-shaped or circular slot line pattern unit 213, and the divided signals are transmitted. After this, the divided signals are offset by a phase difference of 180° therebetween at a location at which the divided signals are added, that is, at a transition location between loop-shaped or circular slot line pattern unit 213 and the third microstrip line 113, thereby achieving signal interception, so that a high isolation characteristic is provided.

In a reception mode, when the first diode D 1 is turned on and an RF reception signal is applied to the second port through the antenna terminal "Ant", the reception signal is input to the second node of the circulator 11 via the second microstrip line 112, is output through the third node of the circulator 11, passes through the slot line pattern unit 300 according to the present invention, and is output to the reception terminal "Rx" via the third microstrip line 113 which is the third port. In this case, since the first diode D 1 in the loop-shaped or circular slot line pattern unit 213 is in the "on" state, a slot line beneath the first diode D 1 is maintained in a conducting state so as to interrupt a signal flow along the slot line, and the signal flow is continued through a slot line of the lower surface corresponding to an installation location of the first capacitor C 1. Thereafter, the reception signal is transited by the third micro strip line 113 having a length of $\lambda/8$ and is transmitted.

While the present invention has been shown and described with reference to the construction and operation of the RF switch according to an embodiment thereof, various modifications in form and details may be made therein without departing from the scope of the invention. Such modifications of the RF switches will now be described in detail with reference to FIGS. 3 to 7.

First, the RF switch shown in FIG. 3 has the same construction as that of the RF switch shown in FIG. 2, except for a switching device installed in the loop-shaped or circular slot line pattern unit 213 of the slot line pattern unit 300. It can be understood that the switching device of FIG. 3 includes a second diode D 2, instead of the first capacitor C 1 shown in FIG. 2. In this case, the first and second diodes D 1 and D 2 are set in such a manner that both diodes are in an "off" state in a transmission mode, and one of the diodes is in an "on" state while the other is in an "off" state in a reception mode.

The RF switch shown in FIG. 4 has the same construction as that of the RF switch shown in FIG. 3, except for the end portion of the fourth microstrip line 114 in the slot line pattern unit 300. That is, the fourth microstrip line 114 in FIG. 4 is provided at the end portion with a terminal open circuit which has an open end extended by a length of $\lambda/4$ from a point of intersection between the fourth microstrip line 114 and the first slot line 212.

The RF switch shown in FIG. 5 has the same construction as that of the RF switch shown in FIG. 2, except that the end portion of the fourth microstrip line 114 in the slot line pattern unit 300 in FIG. 5 is provided with a terminal open circuit which has an open end extended by a length of $\lambda/4$ from a point of intersection between the fourth microstrip line 114 and the first slot line 212, similar to the RF switch of FIG. 4.

The RF switch shown in FIG. 6 has the same construction as that of the RF switch shown in FIG. 4, except that the end portion of the third microstrip line 113 is provided with a terminal short circuit. Similarly, the RF switch shown in FIG. 7 has the same construction as that of the RF switch shown in FIG. 5, except that the end portion of the third microstrip line 113 is provided with a terminal short circuit.

As described with reference to FIGS. 3 to 7, various changes in form and details may be made in the present invention. In addition, the aforementioned microstrip line may be replaced with a strip line, a coaxial line, a coplanar waveguide (CPW), etc. Also, the present invention can be achieved by using a coplanar strip (CPS) in place of the slot line. In addition, while embodiments of the present invention have been described about a case in which a diode is used as a switching device, the present invention can be achieved by using a different semiconductor device (e.g., FET) having a switching function.

While the present invention has been shown and described with reference to certain preferred embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

The invention claimed is:

1. A radio frequency (RF) switch comprising:
a circulator having first to third nodes, which are connected to first to third ports, respectively; and
a slot line pattern unit installed in a connection line between the third node of the circulator and the third port so as to carry out signal transmission or interception, wherein the slot line pattern unit includes a switching circuit, which is installed at a predetermined location so as to transmit or intercept a signal by maintaining or short-circuiting a gap of a slot line corresponding to the installed location according to an external switching control signal, and a plurality of slot lines formed in predetermined patterns, the slot line pattern unit further including:
a first slot line which is provided at a first end thereof with an open slot so that a signal transition occurs between the first slot line and a transmission line connected to the third node of the circulator; and
a loop-shaped slot line pattern unit connected to a second end of the first slot line so that a signal transition occurs between the loop-shaped slot line pattern unit and a transmission line forming the third port at a location of the loop-shaped slot line pattern unit, which is opposite to a location of the loop-shaped slot line pattern unit connected to the first slot line, and the switching circuit comprises first and second switching elements, each of which is installed between both ends of the loop-shaped slot line pattern unit at a connection location between the loop-shaped slot line pattern unit and the first slot line so as to short-circuit gap of a slot line at the corresponding location.

2. The RF switch as claimed in claim 1, wherein one of the first and second switching elements includes a diode, and the other switching element includes either another diode or a capacitor.

3. The RF switch as claimed in any one of claims 1 to 2, wherein each end portion of the transmission lines is provided with a terminal open circuit or a terminal short circuit.

4. The RF switch as claimed in any one of claims 1 to 2, wherein each of the transmission lines includes any one selected from the group of a microstrip line, a strip line, a coaxial line and a coplanar waveguide (CPW).

5. A radio frequency (RF) switch for transmission/reception changeover in a time division duplexing/multiplexing system, the RF switch comprising:
 a circulator having first, second and third nodes connected to first, second and third ports, respectively, which are connected with a transmission terminal, an antenna terminal and a reception terminal, respectively, the circulator outputting a transmission signal, which has been input through the first node from the transmission terminal, to the antenna terminal through the second node, the circulator outputting a reception signal, which has been input through the second node from the antenna terminal, to the reception terminal through the third node; and
 a slot line pattern unit installed in a connection line between the third node of the circulator and the third port so as to carry out signal transmission or interception, wherein the slot line pattern unit includes a switching circuit, which is installed at a predetermined location so as to transmit or intercept a signal by maintaining or short-circuiting a gap of a slot line corresponding to the installed location according to an external switching control signal, and a plurality of slot lines formed in predetermined patterns, the slot line pattern unit further including:
  a first slot line which is provided at a first end thereof with an open slot so that a signal transition occurs between the first slot line and a transmission line connected to the third node of the circulator; and
  a loop-shaped slot line pattern unit connected to a second end of the first slot line so that a signal transition occurs between the loop-shaped slot line pattern unit and a transmission line forming the third port at a location of the loop-shaped slot line pattern unit, which is opposite to a location of the loop-shaped slot line pattern unit connected to the first slot line, and the switching circuit comprises first and second switching elements, each of which is installed between both ends of the loop-shaped slot line pattern unit at a connection location between the loop-shaped slot line pattern unit and the first slot line so as to short-circuit a gap of a slot line at the corresponding location.

6. The RF switch as claimed in claim 5, wherein one of the first and second switching elements includes a diode, and the other switching element includes either another diode or a capacitor.

7. The RF switch as claimed in any one of claims 5 to 6 wherein each end portion of the transmission lines is formed as a terminal open circuit or a terminal short circuit.

8. The RF switch as claimed in any one of claims 5 to 6 wherein each of the transmission lines includes any one selected from the group of a microstrip line, a strip line, a coaxial line and a coplanar waveguide (CPW).

9. A radio frequency (RF) switch comprising:
 a circulator having first to third nodes, which are connected to first to third ports, respectively; and
 a slot line pattern unit installed in a connection line between the third node of the circulator and the third port so as to carry out signal transmission or interception, the slot line pattern unit including:
  a switching circuit installed at a predetermined location so as to transmit or intercept a signal by maintaining or short-circuiting a gap of a slot line corresponding to the installed location according to an external switching control signal;
  a first slot line which is provided at a first end thereof with an open slot so that a signal transition occurs between the first slot line and a transmission line connected to the third node of the circulator; and
  a circular slot line pattern unit connected to a second end of the first slot line so that a signal transition occurs between the circular slot line pattern unit and a transmission line forming the third port at a location of the circular slot line pattern unit, which is opposite to a location of the circular slot line pattern unit connected to the first slot line.

10. The RF switch as claimed in claim 9, wherein the switching circuit further comprises first and second switching elements, each of which is installed between both ends of the circular slot line pattern unit at a connection location between the circular slot line pattern unit and the first slot line so as to short-circuit a gap of a slot line at the corresponding location.

11. The RF switch as claimed in claim 10, wherein one of the first and second switching elements includes a diode, and the other switching element includes either another diode or a capacitor.

12. The RF switch as claimed in claim 9, wherein each end portion of the transmission lines is provided with a terminal open circuit or a terminal short circuit.

13. The RF switch as claimed in claim 9, wherein each of the transmission lines includes any one selected from the group of a microstrip line, a strip line, a coaxial line and a coplanar waveguide (CPW).

\* \* \* \* \*